(12) United States Patent
Ono et al.

(10) Patent No.: US 11,519,287 B2
(45) Date of Patent: Dec. 6, 2022

(54) ROTATING MACHINE

(71) Applicant: Mitsubishi Power, Ltd., Yokohama (JP)

(72) Inventors: Hideki Ono, Tokyo (JP); Chongfei Duan, Tokyo (JP); Kazuyuki Matsumoto, Tokyo (JP); Yoshihiro Kuwamura, Tokyo (JP); Hisataka Fukushima, Kanagawa (JP); Hideaki Sugishita, Tokyo (JP); Kiyoshi Segawa, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/422,805

(22) PCT Filed: Nov. 13, 2019

(86) PCT No.: PCT/JP2019/044477
§ 371 (c)(1),
(2) Date: Jul. 14, 2021

(87) PCT Pub. No.: WO2020/158105
PCT Pub. Date: Aug. 6, 2020

(65) Prior Publication Data
US 2022/0127968 A1    Apr. 28, 2022

(30) Foreign Application Priority Data

Jan. 31, 2019 (JP) .............................. JP2019-015195

(51) Int. Cl.
*F01D 11/08* (2006.01)
*F01D 25/14* (2006.01)
(Continued)

(52) U.S. Cl.
CPC .............. *F01D 11/08* (2013.01); *F01D 25/14* (2013.01); *F02C 7/28* (2013.01); *F16J 15/4472* (2013.01)

(58) Field of Classification Search
CPC ....... F16J 15/4472; F01D 5/225; F01D 11/02; F01D 11/08; F01D 25/14; F02C 7/28; (Continued)

(56) References Cited

U.S. PATENT DOCUMENTS 9,689,272 B2    6/2017  Sakamoto et al.
9,726,027 B2    8/2017  Kuwamura et al.
(Continued)

FOREIGN PATENT DOCUMENTS

CN    103097666 A    5/2013
CN    103477032 A    12/2013
(Continued)

OTHER PUBLICATIONS

Office Action dated Mar. 4, 2022, issued in counterpart IN Application No. 202147032137, with English Translation. (6 pages).
(Continued)

*Primary Examiner* — Igor Kershteyn
(74) *Attorney, Agent, or Firm* — WHDA, LLP

(57) ABSTRACT

A rotating machine includes a hollow casing; a rotating body rotatably supported in the casing; a stator blade fixed to an inner peripheral portion of the casing; a rotor blade fixed to an outer peripheral portion of the rotating body to be offset to the stator blade in an axial direction of the rotating body; a sealing device arranged between the inner peripheral portion and a tip of the rotor blade; a swirling flow generation chamber provided in the casing on a downstream side in a fluid flow direction from the sealing device along a circumferential direction of the rotating body; first guiding members provided in the swirling flow generation chamber (Continued)

along a radial direction and in a circumferential direction of the rotating body at predetermined intervals; and a second guiding member provided in the chamber along the circumferential direction while intersecting the first guiding members.

13 Claims, 5 Drawing Sheets

(51) Int. Cl.
  *F02C 7/28* (2006.01)
  *F16J 15/44* (2006.01)
  *F16J 15/447* (2006.01)

(58) Field of Classification Search
  CPC ........... F05D 2220/31; F05D 2240/126; F05D 2240/127; F05D 2240/129
  See application file for complete search history.

(56) References Cited

U.S. PATENT DOCUMENTS

| | | |
|---|---|---|
| 2013/0149124 A1 | 6/2013 | Kuwamura et al. |
| 2014/0056690 A1 | 2/2014 | Sakamoto et al. |
| 2014/0119901 A1 | 5/2014 | Shibata et al. |
| 2015/0132114 A1 | 5/2015 | Fukushima et al. |
| 2017/0016342 A1 | 1/2017 | Shibata et al. |
| 2018/0156044 A1* | 6/2018 | Clark ...................... F23R 3/005 |
| 2018/0187697 A1* | 7/2018 | Urac ...................... F04D 29/541 |
| 2018/0363466 A1* | 12/2018 | Gallier ................... F01D 5/187 |
| 2022/0120188 A1* | 4/2022 | Duan ...................... F01D 11/02 |
| 2022/0186628 A1* | 6/2022 | Kuwamura ............ F16J 15/447 |

FOREIGN PATENT DOCUMENTS

| | | |
|---|---|---|
| DE | 2462465 A1 | 4/1977 |
| EP | 2 096 262 A1 | 9/2009 |
| JP | 57-8302 A | 1/1982 |
| JP | 2004-11553 A | 1/2004 |
| JP | 2007-321721 A | 12/2007 |
| JP | 2009-47043 A | 3/2009 |
| JP | 2012002234 A | 1/2012 |
| JP | 2014-84816 A | 5/2014 |
| JP | 2014-234714 A | 12/2014 |
| JP | 2015-94220 A | 5/2015 |
| JP | 5985351 B2 | 9/2016 |

OTHER PUBLICATIONS

International Search Report dated Jan. 28, 2020, issued in counterpart International Application No. PCT/JP2019/044477 (3 pages).

* cited by examiner

ROTATING MACHINE

FIELD

The present invention relates to a rotating machine in which a sealing device for suppressing fluid leakage between a stationary side and a rotating side is arranged.

BACKGROUND

For example, a steam turbine is configured such that a rotor is rotatably supported in a casing by bearings, and multiple stages of rotor blades are fixed to the rotor while multiple stages of stator blades are fixed to the casing so as to be located between the multiple stages of rotor blades. When steam is supplied from a supply port of the casing, the steam passes through the rotor blades and the stator blades to allow the rotor to be driven and rotated via the rotor blades, and is discharged to the outside from a discharge port.

In such a steam turbine, a sealing device is provided between tips of the rotor blades and the casing to suppress the axial leakage flow of the steam between the casing and the tips of the rotor blades. In general, the sealing device is applied to a labyrinth seal. The labyrinth seal is configured by providing a plurality of seal fins on the tip of the rotor blade or an inner surface of the casing. By forming a gap between the seal fins and the inner surface of the casing or the tip of the rotor blade, a pressure ratio at the rear and front of each seal fin is reduced to suppress a leakage flow rate.

The flow of steam leaking from the sealing device merges into the main flow of the steam having passed through the rotor blades or the stator blades. The main flow of the steam having passed through the rotor blades is a flow along the axial direction of the rotor, but the flow of the steam leaking from the sealing device without passing through the rotor blades is a flow that is inclined toward the rotor side from the inner circumferential surface of the casing and swirls in the circumferential direction of the rotor by the stator blades. In such a case, it is important to reduce mixing loss at a merging portion and suppress performance degradation by allowing the flow of the leakage steam from the sealing device to smoothly merge into the main flow of the steam. As such a technology, there is a technology disclosed in Patent Literature 1 below.

CITATION LIST

Patent Literature

Patent Literature 1: Japanese Patent No. 5985351

SUMMARY

Technical Problem

In an axial flow turbine in Patent Literature 1 described above, a swirling flow adjustment chamber is provided on a downstream side from seal fins and a plurality of shielding plates extending in the axial direction and the radial direction of a rotor are fixed to the swirling flow adjustment chamber. Therefore, the flow of steam leaking from a sealing device without passing through rotor blades and swirling in the circumferential direction decreases in velocity component in the circumferential direction by the shielding plates, so that the flow of the leakage steam from the sealing device can smoothly merge into the main flow of steam. However, in the axial flow turbine according to the related art, since the shielding plate has a plate shape extending in the axial direction and the radial direction of the rotor, when the flow of steam along the circumferential direction collides with the shielding plate, a separation vortex may be generated at a connection portion of the shielding plate, resulting in pressure loss.

The present invention has been made to solve the problems described above and an object of the present invention is to provide a rotating machine capable of reducing mixing loss at a merging portion and improving performance by allowing a fluid leaking from a sealing device to smoothly merge into the main flow of a fluid.

Solution to Problem

In order to solve the problems described above, a rotating machine according to the present invention includes a casing having a hollow shape; a rotating body rotatably supported in the casing; a stator blade fixed to an inner peripheral portion of the casing; a rotor blade fixed to an outer peripheral portion of the rotating body to be offset to the stator blade in an axial direction of the rotating body; a sealing device arranged between the inner peripheral portion of the casing and a tip of the rotor blade; a swirling flow generation chamber provided in the casing on a downstream side in a fluid flow direction from the sealing device along a circumferential direction of the rotating body; a plurality of first guiding members provided in the swirling flow generation chamber along a radial direction of the rotating body and in a circumferential direction of the rotating body at predetermined intervals; and a second guiding member provided in the swirling flow generation chamber along the circumferential direction of the rotating body while intersecting the first guiding members.

Consequently, when a fluid is supplied to the inside of the casing, the main flow of the fluid passes through the stator blade and the rotor blade to rotate the rotor blade, a part of the fluid passes through the stator blade and then flows between the casing and the tip of the rotor blade, but the sealing device serves to suppress the leakage of the fluid. At this time, a part of the fluid leaks from the sealing device, and the leakage fluid swirls in the swirling flow generation chamber and then merges into the main flow of the fluid having passed through the stator blade and the rotor blade. Since the leakage fluid leaking from the sealing device has a velocity component in the circumferential direction because it passes through the stator blade but does not pass through the rotor blade. Here, the leakage fluid with the velocity component in the circumferential direction is guided by the first guiding members when flowing into the swirling flow generation chamber, so that the velocity component in the circumferential direction is reduced. Furthermore, the leakage fluid that has flowed into the swirling flow generation chamber is guided by the second guiding member and swirls outward in the radial direction and inward in the radial direction. Since the swirling flows of the outer and inner fluids are quieted by the second guiding member, variations in the shapes of the swirling flows due to disturbance are suppressed and proper shapes of the swirling flows are maintained, and the swirling flows are discharged from the swirling flow generation chamber and merge into the main flow of the fluid. As a consequence, by allowing the fluid leaking from the sealing device to smoothly merge into the main flow of the fluid, it is possible to reduce mixing loss at the merging portion and improve performance.

In the rotating machine according the present invention, the second guiding member is provided at a position facing the axial direction of the rotating body with respect to a leakage position of a fluid in the sealing device.

Consequently, the second guiding member is provided to face the leakage position of the fluid in the sealing device, so that the leakage fluid from the sealing device can be guided by the second guiding member to properly generate the swirling flows of outer and inner swirling fluids.

In the rotating machine according the present invention, the sealing device has a seal fin that extends from one to another one of the inner peripheral portion of the casing and the tip of the rotor blade and forms a gap, and the second guiding member is provided to face the downstream side in the fluid flow direction with respect to the gap.

Consequently, the second guiding member is provided to face the gap of the sealing deice, so that the leakage fluid from the sealing device can be guided by the second guiding member to properly generate the swirling flows of the outer and inner swirling fluids.

In the rotating machine according the present invention, the sealing device has a seal fin that extends from the inner peripheral portion of the casing to the tip of the rotor blade and forms a gap, and a tip of the second guiding member is located outside in the radial direction of the rotating body from the tip of the rotor blade and is located inside in the radial direction of the rotating body from a tip of the seal fin.

Consequently, the tip of the second guiding member is located outside in the radial direction from the tip of the rotor blade and is located inside in the radial direction from the tip of the seal fin, so that the leakage fluid from the sealing device can be dispersed into the outer swirling flow and the inner swirling flow by the second guiding member to generate the swirling flow having a proper shape.

In the rotating machine according the present invention, the first guiding members and the second guiding member have a same length in the axial direction of the rotating body.

Consequently, the first guiding member and the second guiding member have the same length, so that it is possible to properly maintain the shapes of the outer swirling flow and the inner swirling flow generated by the second guiding member.

In the rotating machine according the present invention, a length of the second guiding member in the axial direction of the rotating body is shorter than a length of the first guiding members in the axial direction of the rotating body.

Consequently, the length of the second guiding member is shorter than that of the first guiding member, so that it is possible to effectively reduce the velocity component in the circumferential direction of the leakage fluid by the first guiding members, and to reduce the friction loss of the leakage fluid due to contact between the leakage fluid and the second guiding member.

In the rotating machine according the present invention, the swirling flow generation chamber includes an inner circumferential surface of the casing, a first wall surface facing the downstream side in the fluid flow direction with respect to the sealing device in the casing, and a second wall surface facing inward in the radial direction of the rotating body with respect to the inner circumferential surface of the casing, and the second guiding member extends from the first wall surface to an upstream side in the fluid flow direction.

Consequently, the second guiding member is provided to extend from the first wall surface of the swirling flow generation chamber to the upstream side, so that it is possible to properly generate the outer swirling flow and the inner swirling flow in the swirling flow generation chamber by the second guiding member.

In the rotating machine according the present invention, a recessed portion is formed in the inner circumferential surface of the casing, a shroud fixed to the tip of the rotor blade is arranged in the recessed portion with a predetermined gap, the swirling flow generation chamber is provided in the recessed portion on the downstream side in the fluid flow direction and includes an inner circumferential surface of the recessed portion, the first wall surface provided in the recessed portion, and the second wall surface provided on a protrusion extending from the inner circumferential surface of the casing to the upstream side in the fluid flow direction, and an inner surface of the protrusion in the radial direction of the rotating body is located outside in the radial direction off the rotating body from an inner surface of the shroud in the radial direction of the rotating body.

Consequently, since the swirling flow generation chamber is provided on the downstream side of the recessed portion in which the shroud of the rotor blade is arranged and the inner surface of the protrusion for forming the second wall surface is located outside from the inner surface of the shroud, when the swirling flow of the fluid generated in the swirling flow generation chamber is guided to an end portion of the shroud and then merges into the main flow as a leakage fluid, the leakage fluid can be smoothly merged while the protrusion does not get in the way and the leakage fluid does not interfere with the main flow of the fluid.

In the rotating machine according the present invention, the shroud is provided on the downstream side in the fluid flow direction with a third guiding member facing the protrusion in the axial direction of the rotating body.

Consequently, since the third guiding member facing the protrusion is provided on the downstream side of the shroud, when the swirling flow of the fluid generated in the swirling flow generation chamber is guided to the end portion of the shroud, the fluid is guided by the third guiding member, so that the leakage fluid can be smoothly merged into the main flow while the leakage fluid does not interfere with the main flow of the fluid.

In the rotating machine according the present invention, the second guiding member has a tapered shape from the first wall surface to the upstream side in the fluid flow direction.

Consequently, the second guiding member has a tapered shape, so that the leakage fluid from the sealing device can be properly generated as the swirling flows of the outer and inner fluids by the second guiding member.

In the rotating machine according the present invention, a first curved surface is provided at a connection portion between the second guiding member and the first wall surface.

Consequently, since the first curved surface is provided at the connection portion between the second guiding member and the first wall surface, when the leakage fluid from the sealing device is guided by the second guiding member and the swirling flows of the outer and inner fluids are generated in the swirling flow generation chamber, the leakage fluid flows from the second guiding member to the first wall surface via the first curved surface, so that it is possible to suppress the generation of a separation vortex in the swirling flow generation chamber and to reduce pressure loss.

In the rotating machine according the present invention, a second curved surface is provided at a connection portion between the inner circumferential surface of the casing and the first wall surface, and a third curved surface is provided at a connection portion between the first wall surface and the second wall surface.

Consequently, since the second curved surface is provided at the connection portion between the inner circumferential surface of the casing and the first wall surface and the third curved surface is provided at the connection portion between the first wall surface and the second wall surface, when the leakage fluid from the sealing device is guided by the second guiding member and the swirling flows of the outer and inner fluids are generated in the swirling flow generation chamber, the leakage fluid flows from the first wall surface to the inner circumferential surface via the second curved surface and flows from the first wall surface to the second wall surface via the third curved surface, so that it is possible to suppress the generation of a separation vortex in the swirling flow generation chamber and to reduce pressure loss.

In the rotating machine according the present invention, the swirling flow generation chamber is divided by the second guiding member into first swirling flow generation chambers located outside in the radial direction of the rotating body and second swirling flow generation chambers located inside in the radial direction of the rotating body, and number of the first guiding members in the second swirling flow generation chambers is larger than number of the first guiding members in the first swirling flow generation chambers.

Consequently, since the number of the first guiding members in the second swirling flow generation chambers is larger than that of the first guiding members in the first swirling flow generation chambers, that is, since the number of the first guiding members in the first swirling flow generation chambers is small, when the swirling flow of the fluid repeatedly swirls in the first swirling flow generation chambers, it is possible to reduce separation of the fluid from the first guiding members. Since the number of the first guiding members in the second swirling flow generation chambers is large, when the swirling flow of the fluid swirls in the second swirling flow generation chambers only once, it is possible to effectively reduce the velocity component in the circumferential direction by the first guiding members.

Advantageous Effects of Invention

With the rotating machine according to the present invention, it is possible to reduce mixing loss at a merging portion and improve performance by allowing a fluid leaking from the sealing device to smoothly merge into the main flow of a fluid.

DESCRIPTION OF EMBODIMENTS

Hereinafter, preferred embodiments of a rotating machine according to the present invention will be described in detail with reference to the accompanying drawings. Note that the present invention is not limited by the embodiments, and furthermore, when there are a plurality of embodiments, the present invention also includes those configured by combining those embodiments.

First Embodiment

Figure 5:
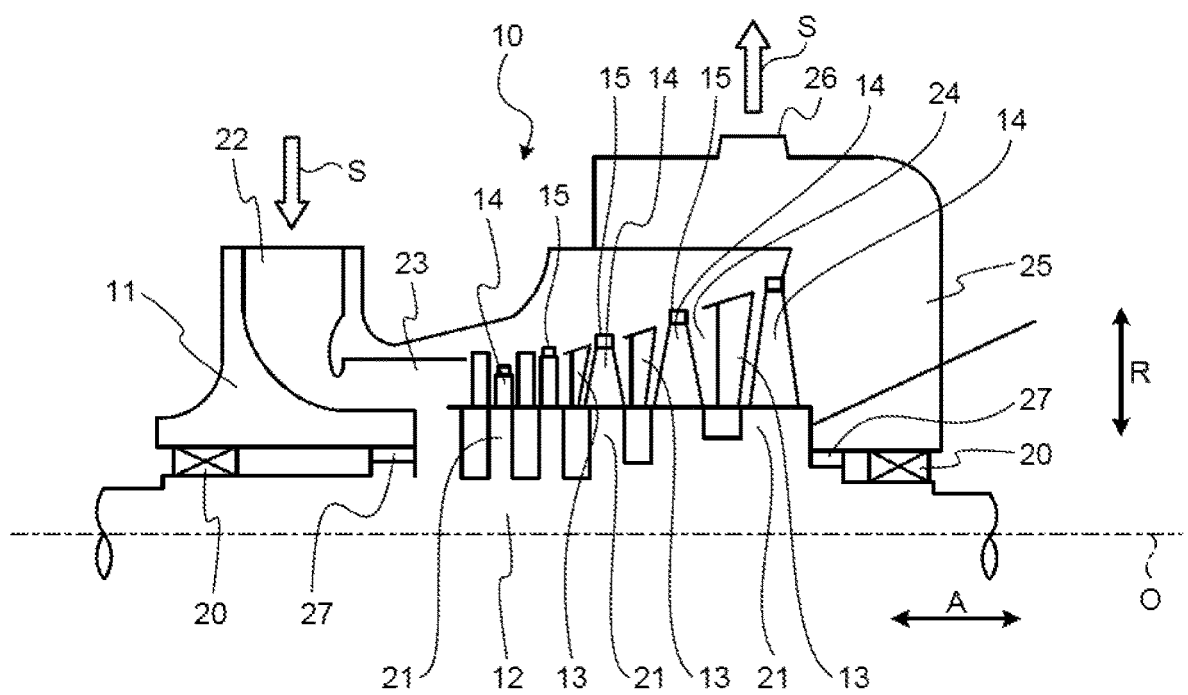
FIG. 5 is a schematic view illustrating the steam turbine of the first embodiment.

FIG. 5 is a schematic view illustrating a steam turbine of a first embodiment. In the following description, the axial direction of a rotor is indicated by A, the radial direction of the rotor is indicated by R, and the circumferential direction of the rotor is indicated by C.

In the present embodiment, a steam turbine will be described as an example of a rotating machine according to the present invention. As illustrated in FIG. 5, a steam turbine 10 includes a casing 11, a rotor (rotating body) 12, stator blades 13, rotor blades 14, and sealing devices 15.

The casing 11 has a hollow shape and the rotor 12 is arranged inside the casing 11 along the horizontal direction. The rotor 12 is rotatably supported around a center axis O by bearings 20 provided in the casing 11. A plurality of stator blades 13 are fixed to an inner peripheral portion of the casing 11 at predetermined intervals in the axial direction A of the rotor 12. A plurality of rotor discs 21 are fixed to an outer peripheral portion of the rotor 12 at predetermined intervals in the axial direction A, and a plurality of rotor blades 14 are fixed to outer peripheral portions of the rotor discs 21, respectively. The stator blades 13 and the rotor blades 14 are arranged along the radial direction R of the rotor 12, are arranged at predetermined intervals in the circumferential direction of the rotor 12, and are alternately arranged along the axial direction A of the rotor 12.

The casing 11 is provided on one end side thereof in the axial direction A with a steam inlet 22, and the steam inlet 22 is communicated with a blade cascade part 24 in which the stator blades 13 and the rotor blades 14 are arranged, through a steam passage 23. The blade cascade part 24 is communicated with a steam discharge port 26 through an exhaust hood 25.

Furthermore, the rotor 12 is provided with a sealing member 27 between each end portion in the axial direction A and the casing 11. Each sealing member 27 is arranged inward from each bearing 20, that is, on the side of the stator blade 13 and the rotor blade 14. Moreover, the sealing device 15 is provided between the tip of the rotor blade 14 located outside the radial direction R and the inner peripheral portion of the casing 11.

Therefore, when steam S is supplied from the steam inlet 22 to the blade cascade part 24 through the steam passage 23, the steam S passes through the stator blades 13 and the rotor blades 14, so that the rotor 12 is driven and rotated via each rotor blade 14 to drive a generator (not illustrated) connected to the rotor 12. Thereafter, the steam S having driven the rotor blades 14 is discharged from the steam discharge port 26 through the exhaust hood 25.

Figure 1:
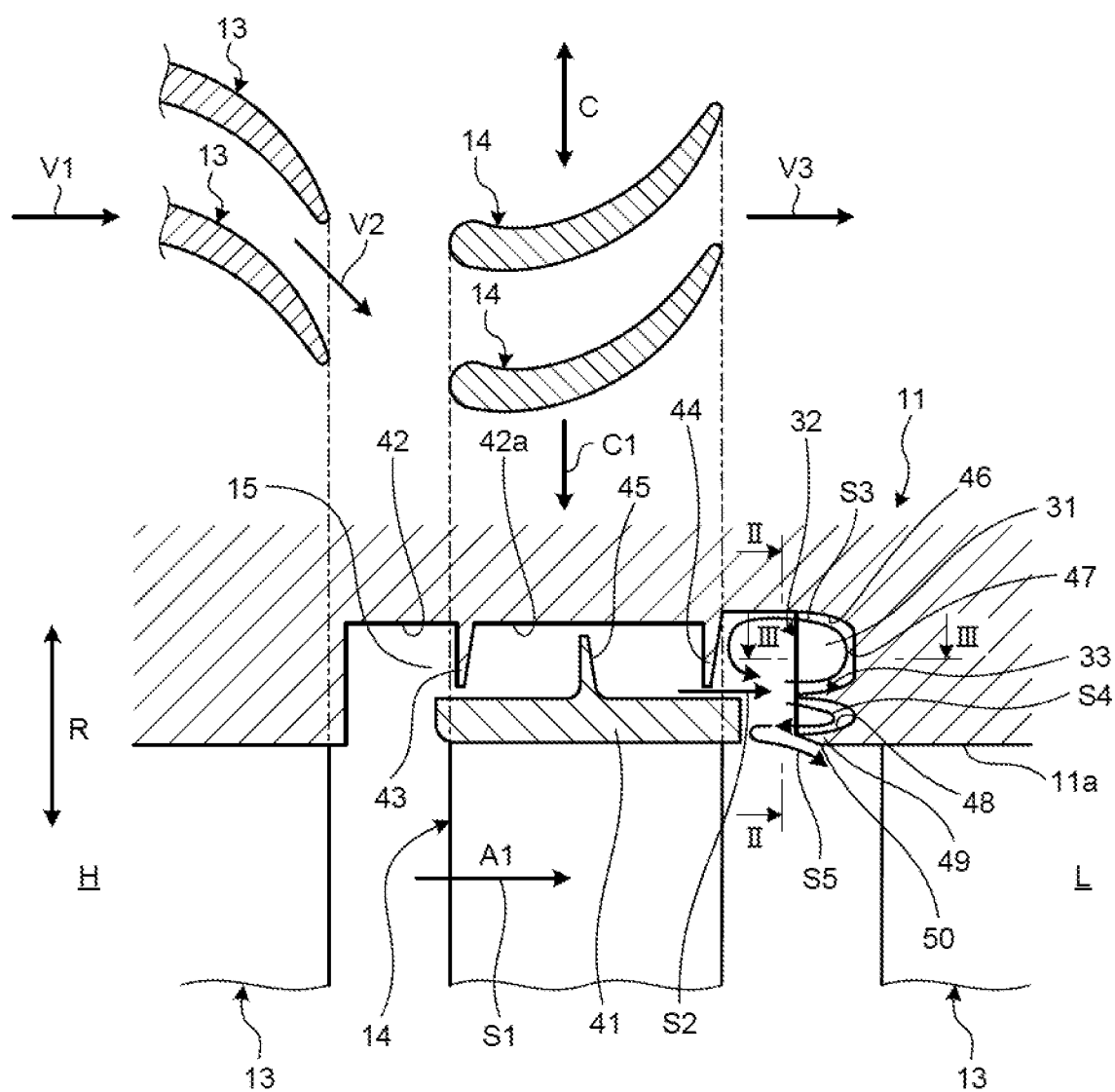
FIG. 1 is a sectional view of main elements for explaining the flow of steam in a steam turbine as a rotating machine of a first embodiment.
Figure 2:
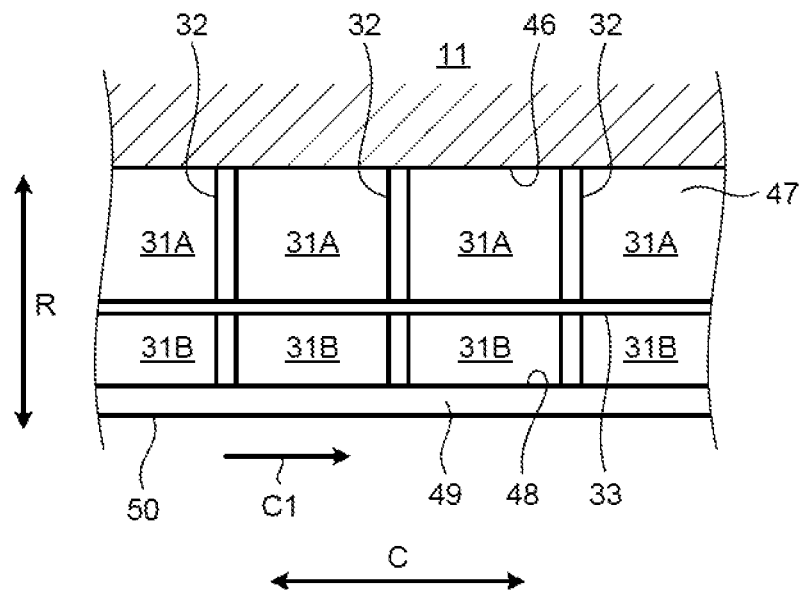
FIG. 2 is a sectional view taken along line II-II of FIG. 1.
Figure 3:
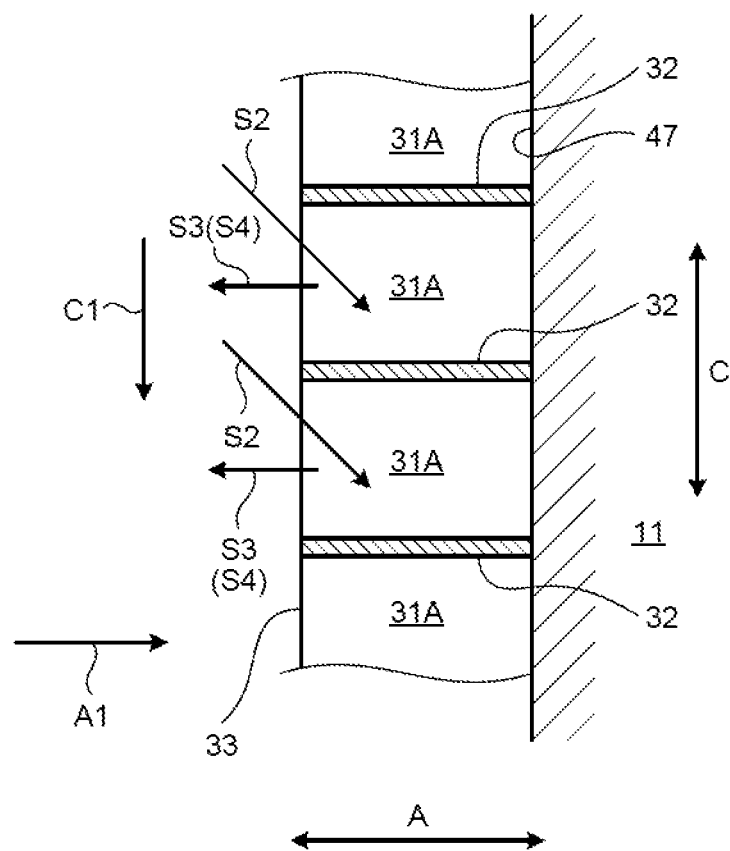
FIG. 3 is a sectional view taken along line III-III of FIG. 1.
Figure 4:
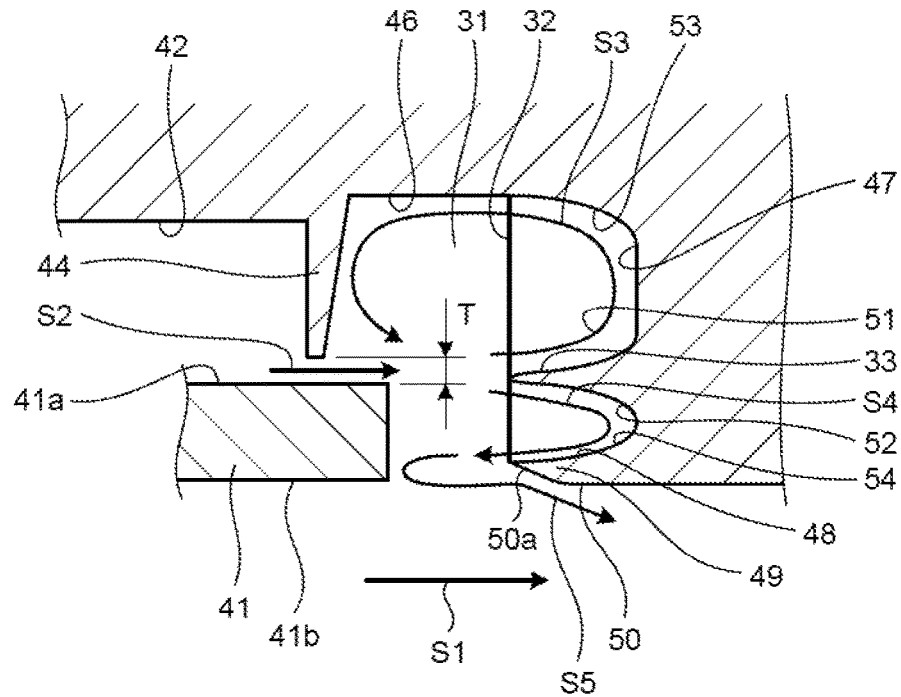
FIG. 4 is an explanatory diagram for explaining the positional relation among a second guiding member, a seal fin, and a shroud.

Hereinafter, the relation among the casing 11, the stator blades 13, the rotor blades 14, and the sealing device 15 in the aforementioned steam turbine 10 will be described in detail. FIG. 1 is a sectional view of main elements for explaining the flow of steam in the steam turbine as the rotating machine of the first embodiment, FIG. 2 is a sectional view taken along line II-II of FIG. 1, FIG. 3 is a sectional view taken along line III-III of FIG. 1, and FIG. 4 is an explanatory diagram for explaining the positional relation among a second guiding member, a seal fin, and a shroud.

As illustrated in FIG. 1 to FIG. 4, the sealing device 15 is provided between the casing 11 and the tip of the rotor blade 14. The sealing device 15 suppresses the leakage of the flow of the steam (fluid) S that flows between the casing 11 and the tip of the rotor blade 14 from a high-pressure side H to a low-pressure side L along the axial direction A of the rotor 12. Here, the steam S flows from the high-pressure side H to the low-pressure side L, and main flow steam S1 flows along a steam flow direction A1 to pass through the stator blades 13 and the rotor blades 14. Furthermore, after the main flow steam S1 passes through the stator blades 13, a part of the main flow steam S1 flows to the sealing device 15 between the casing 11 and the tip of the rotor blade 14 and is generated as leakage steam S2 that leaks from the sealing device 15. Since the leakage steam S2 passes through the stator blades 13, but does sot pass through the rotor blades 14, the leakage steam S2 has a velocity component in the circumferential direction C.

That is, the main flow steam S1 is a flow in the axial direction A with almost no velocity component in the circumferential direction C, and flows into a leading edge side of the stator blade 13 at an absolute velocity vector V1. The main flow steam S1 is accelerated and turned when passing through between the stator blades 13, becomes an absolute velocity vector V2 with the velocity component in the circumferential direction C, and flows out from a trailing edge side of the stator blade 13. Most of the steam S that has flowed out from the stator blade 13 collides with the rotor blade 14, thereby rotating the rotor 12 together with the rotor blade 14 in a rotational direction C1 at a predetermined rotation speed. At this time, the steam S is decelerated and turned when passing through the rotor blade 14, and becomes an absolute velocity vector V3 along the axial direction A that has almost no velocity component in the circumferential direction C. However, even when the main flow steam S1 is a flow with the velocity component in the circumferential direction C, the operation of rotating the rotor blade 14 is the same.

On the other hand, the absolute velocity vector V2 of the steam S having passed through between the stator blades 13 has the velocity component in the circumferential direction C, and the leakage steam S2 leaking from the sealing device 15 without passing through the rotor blade 14 is a flow with the velocity component in the circumferential direction C although its velocity changes due to acceleration/deceleration by seal fins to be described later and viscosity friction of a side wall and a cover. Therefore, when the leakage steam S2 merges into the main flow steam S1 with the absolute velocity vector V3 having almost no velocity component in the circumferential direction C, mixing loss occurs at the merging portion.

So far, an impulse turbine in which the main flow steam S1 has almost no velocity component in the circumferential direction C has been described, but even in the case of a reaction turbine in which the main flow steam S1 has the velocity component in the circumferential direction C, since direction vectors of the main flow steam S1 and the leakage steam S2 are different from each other, mixing loss occurs at the merging portion as in the impulse turbine. The present invention is also applicable to and effective for the reaction turbine.

The steam turbine 10 of the first embodiment includes a swirling flow generation chamber 31, a plurality of first guiding members 32, and a second guiding member 33. The swirling flow generation chamber 31 is provided in the casing 11 on a downstream side in the steam flow direction A1 from the sealing device 15 along the circumferential direction C of the rotor 12. The first guiding members 32 are provided in the swirling flow generation chamber 31 along the radial direction R of the rotor 12 and in the circumferential direction C of the rotor 12 at predetermined intervals. The second guiding member 33 is provided in the swirling flow generation chamber 31 along the circumferential direction C of the rotor 12 while intersecting the first guiding members 32.

A base end portion of the stator blade 13 located outside in the radial direction R is fixed to the inner peripheral portion of the casing 11, and a base end portion of the rotor blade 14 located inside in the radial direction R is fixed to the outer peripheral portion of the rotor 12 (see FIG. 4). The rotor blade 14 is arranged between the stator blades 13 arranged at predetermined intervals in the axial direction A. The rotor blade 14 is provided at the tip thereof located outside in the radial direction R with a shroud 41. The sealing device 15 is arranged between the inner peripheral portion of the casing 11 and an outer peripheral portion of the shroud 41 of the rotor blade 14.

The casing 11 is provided with a recessed portion 42 on an inner circumferential surface 11a thereof, which faces the outer peripheral portion of the shroud 41. The recessed portion 42 is an annular groove provided along the circumferential direction C of the rotor 12. The shroud 41 of the rotor blade 14 is arranged in the recessed portion 42 of the casing 11 with a predetermined gap. The sealing device 15 has a plurality oi seal fins 43, 44, 45. Base end portions of the seal fins 43 and 44 are fixed to an inner circumferential surface 42a of the recessed portion 42 of the casing 11, and tips of the seal fins 43 and 44 extend toward an outer circumferential surface 41a of the shroud 41 of the rotor blade 14. The seal fin 45 is arranged between the seal fins 43 and 44, and has a base end portion fixed to the outer circumferential surface 41a of the shroud 41 of the rotor blade 14 and a tip extending toward the inner circumferential surface 42a of the recessed portion 42 of the casing 11.

The seal fins 43, 44, 45 are provided at predetermined intervals in the axial direction A of the rotor 12. The seal fins 43, 44, 45 are provided along the circumferential direction C of the rotor 12. A predetermined gap is secured between the tips of the seal fins 43 and 44 and the outer circumferential surface 41a of the shroud 41. Furthermore, a predetermined gap is secured between the tip of the seal fin 45 and the inner circumferential surface 42a of the recessed portion 42. The respective gaps are set to substantially the same distensions. Note that the number and mounting positions of the seal fins 43, 44, 45 are not limited to those described above.

The length of the recessed portion 42 of the casing 11 in the axial direction A is longer than that of the shroud 41 of the rotor blade 14 in the axial direction A. That is, the recessed portion 42 is provided from an upstream side in the steam flow direction A1 from a leading edge of the rotor blade 14 to the downstream side in the steam flow direction A1 from a trailing edge of the rotor blade 14. The swirling flow generation chamber 31 is provided in the recessed portion 42 on the downstream side in the steam flow direction A1 from the trailing edge of the rotor blade 14. The swirling flow generation chamber 31 has an inner circumferential surface 46 of the casing 11 (recessed portion 42), a first wall surface 47 facing the downstream side in the steam flow direction A1 with respect to the sealing device 15 in the casing 11, and a second wall surface 48 facing the inside in the radial direction R of the rotor 12 (see FIG. 4) with respect to the inner circumferential surface 11a of the casing 11.

That is, the inner circumferential surface 46 is located outside in the radial direction R from the inner circumferential surface 42a of the recessed portion 42, and is continuous along the circumferential direction C. The first wall surface 47 is a surface parallel to the radial direction R and orthogonal to the inner circumferential surface 46, and is continuous along the circumferential direction C. The casing 11 is provided with a protrusion 49 that is formed on the downstream side in the steam flow direction A1 in the recessed portion 42 and extends from the inner circumferential surface 11a of the casing 11 to the upstream side (recessed portion 42 side) in the steam flow direction A1. The second wall surface 45 is a surface that is provided outside the protrusion 49 in the radial direction R and parallel to the inner circumferential surface 46 while being orthogonal to the first wall surface 47, and is continuous along the circumferential direction C. In such a case, an inner lower surface 50 of the protrusion 49 in the radial direction R is located outside in the radial direction R from an inner lower surface 41b of the shroud 41 in the radial direction R. The protrusion 49 is provided on the tip of the lower surface 50 thereof with an inclination surface 50a.

The first guiding member 32 has a plate shape along the radial direction R and the axial direction A of the rotor 12. The first guiding member 32 is fixed to the inner circumferential surface 46, the first wall surface 47, and the second wall surface 49. An end surface of the first guiding member 32 on the upstream side in the steam flow direction A1 is arranged apart from the seal fin 44 and the shroud 41 by a predetermined distance in the axial direction A.

The second guiding member 33 is provided at a position facing the axial direction A of the rotor 12 with respect to the leakage position of the leakage steam S2 in the sealing device 15. That is, the second guiding member 33 is provided to face the downstream side in the steam flow direction A1 with respect to a gap T (see FIG. 4) between a tip of the seal fin 44 and the outer circumferential surface 41a of the shroud 41. In such a case, a tip of the second guiding member 33 is located, as the tip of the rotor blade 14, outside in the radial direction R from the outer circumferential surface 41a of the shroud 41 and is located inside in the radial direction R from the tip of the seal fin 44.

The second guiding member 33 extends from the first wall surface 47 of the swirling flow generation chamber 31 to the upstream side in the steam flow direction A1. The second guiding member 33 intersects (is orthogonal to) the first guiding members 32. The first guiding members 32 and the second guiding member 33 have the same length in the axial direction A. The first guiding members 32 and the second guiding member 33 intersect each other, so that the swirling flow generation chamber 31 is divided by the second guiding member 33 into a plurality of first swirling flow generation chambers 31A outside in the radial direction R along the circumferential direction C and a plurality of second swirling flow generation chambers 31B inside in the radial direction R along the circumferential direction C.

The second guiding member 33 has a tapered shape from the first wall surface 47 toward the upstream side in the steam flow direction A1. Furthermore, first curved surfaces 51 and 52 are provided at connection portions between the second guiding member 33 and the first wall surface 47. Furthermore, a second curved surface 53 is provided at a connection portion between the inner circumferential surface 46 and the first wall surface 47, and a third curved surface 54 is provided at a connection portion between the first wall surface 47 and the second wall surface 48.

Therefore, when the steam S is supplied to the inside of the casing 11 and the rotor blade 14 is rotated, the steam S flows from the high-pressure side H to the low-pressure side L along the steam flow direction A1. At this time, the steam S flows so that the main flow steam S1 passes through the stator blade 13 and the rotor blade 14, and a part of the steam S flows to the sealing device 15 provided between the casing 11 and the tip of the rotor blade 14 without passing through the rotor blades 14. Although the sealing device 15 suppresses the leakage of the steam S, a part of the steam S leaks and the leakage steam S2 is generated. The leakage steam S2 leaking from the sealing device 15 swirls in the swirling flow generation chamber 31 and then merges into the main flow steam S1 having passed through the stator blade 13 and the rotor blade 14.

At this time, the leakage steam S2 leaking from the sealing device 15 has the velocity component in the circumferential direction C because it passes through the stator blade 13 but does not pass through the rotor blade 14. The leakage steam S2 with the velocity component in the circumferential direction C becomes swirling steams S3 and S4 having a center axis along the circumferential direction C in the swirling flow generation chamber 31. That is, the leakage steam S2 is guided by the first guiding members 32 when flowing into the swirling flow generation chamber 31 and becomes the swirling steams S3 and S4 with a reduced velocity component in the circumferential direction C. Here, the second guiding member 33 is provided in the swirling flow generation chamber 31, so that the leakage steam S2 is guided by the second guiding member 33 and becomes the swirling steam S3 that swirls outward in the radial direction R and the swirling steam S4 that swirls inward in the radial direction R. Since the upper and lower swirling steams S3 and S4 are guided by the second guiding member 33, variations in the shapes of the swirling steams S3 and S4 due to disturbance are suppressed and proper shapes of the swirling steams S3 and S4 are maintained.

Furthermore, the second guiding member 33 has a tapered shape, the first curved surfaces 51 and 52 are provided at the connection portions with the first wall surface 47, the second curved surface 53 is provided at the connection portion between the inner circumferential surface 46 and the first wall surface 47, and the third curved surface 54 is provided at the connection portion between the first wall surface 47 and the second wall surface 49. Therefore, the swirling steams S3 and S4 that swirl in the swirling flow generation chamber 31, reduce a separation vortex on the second guiding member 33, the first wall surface 47, the inner circumferential surface 46, and the second curved surface 53, and the occurrence of pressure loss here is suppressed.

Furthermore, the swirling steam S3 repeatedly swirls in the swirling flow generation chamber 31 and a part of the swirling steam S3 merges into the swirling steam S4. After the merging, the swirling steams S3 and S4 that have swirled in the swirling flow generation chamber 31 are guided to a rear end portion of the shroud 41, pass through between the shroud 41 and the protrusion 49, and then smoothly merge into the main flow steam S1 that has passed through the rotor blade 14, as swirling steam S5 in which the velocity component in the circumferential direction C is reduced.

As described above, the rotating machine of the first embodiment includes the casing 11 having a hollow shape, the rotor 12 rotatably supported in the casing 11, the stator blade 13 fixed to the inner peripheral portion of the casing 11, the rotor blade 14 fixed to the outer peripheral portion of the rotor 12 to be offset to the stator blade 13 in the axial direction A of the rotor 12, the sealing device 15 arranged between the inner peripheral portion of the casing 11 and the tip of the rotor blade 14, the swirling flow generation chamber 31 provided in the casing 11 along the circumferential direction C of the rotor 12 on the downstream side in the steam flow direction A1 from the sealing device 15, the first guiding members 32 provided in the swirling flow generation chamber 31 along the radial direction R of the rotor 12 and in the circumferential direction C of the rotor 12 at predetermined intervals, and the second guiding member 33 provided in the swirling flow generation chamber 31 along the circumferential direction C of the rotor 12 while intersecting the first guiding members 32.

Consequently, the leakage steam S2 with the velocity component in the circumferential direction C is guided by the first guiding members 32 when flowing into the swirling flow generation chamber 31, so that the velocity component in the circumferential direction C of the leakage steam S2 is reduced. Furthermore, the leakage steam S2 that has flowed into the swirling flow generation chamber 31 is guided by the second guiding members 33 and swirls outward in the radial direction R and inward in the radial direction. Since the outer and inner swirling steams S3 and S4 are guided by the second guiding members 33, variations in the shapes of the swirling steams S3 and S4 due to disturbance are suppressed, proper shapes of the swirling steams S3 and S4 are maintained, and the swirling steams S3 and S4 are discharged from the swirling flow generation chamber 31 and merge into the main flow steam S1. As a consequence, by allowing the steam S leaking from the sealing device 15 to smoothly merge into the main flow steam S1, it is possible to reduce mixing loss at the merging portion and improve performance.

In the rotating machine of the first embodiment, the second guiding member 33 is provided at a position facing the axial direction A of the rotor 12 with respect to the leakage position of the leakage steam S2 in the sealing device 15. Consequently, the leakage steam S2 from the sealing device 15 can be guided by the second guiding member 33 to properly generate the outer and inner swirling steams S3 and S4.

In the rotating machine of the first embodiment, the sealing device 15 has the seal fin 44 that extends from the inner circumferential surface 42a of the recessed portion 42 in the casing 11 to the outer circumferential surface 41a of the shroud 41 of the rotor blade 14 and forms the gap T, and the second guiding member 33 is provided to face the downstream side in the steam flow direction A1 with respect to the gap T. Consequently, the leakage steam S2 from the sealing device 15 can be guided by the second guiding member 33 to properly generate the outer and inner swirling steams S3 and S4.

In the rotating machine of the first embodiment, the tip of the second guiding member 33 is located outside in the radial direction R of the rotor 12 from the outer circumferential surface 41a of the shroud 41 and is located inside in the radial direction R of the rotor 12 from the tip of the seal fin 44. Consequently, the leakage steam S2 from the sealing device 15 can be dispersed into an outer swirling flow and the inner swirling steams S3 and S4 by the second guiding member 33 to generate the swirling steams S3 and S4 having a proper shape.

In the rotating machine of the first embodiment, the lengths of the first guiding member 32 and the second guiding member 33 in the axial direction A of the rotor 12 are the same. Consequently, it is possible to properly maintain the shapes of the outer swirling steam S3 and the inner swirling steam S4 generated by the second guiding member 33.

In the rotating machine of the first embodiment, the swirling flow generation chamber 31 includes the inner circumferential surface 46 of the recessed portion 42, the first wall surface 47 facing the downstream side in the steam flow direction A1 with respect to the sealing device 15 in the casing 11, and the second wall surface 48 facing the inside in the radial direction R of the rotor 12 with respect to the inner circumferential surface 42a of the recessed portion 42, and the second guiding member 33 extends from the first wall surface 47 to the upstream side in the steam flow direction A1. Consequently, it is possible to properly generate the outer swirling flow and the inner swirling steams S3 and S4 in the swirling flow generation chamber 31 by the second guiding member 33.

In the rotating machine of the first embodiment, the swirling flow generation chamber 31 is provided in the recessed portion 42 on the downstream side in the steam flow direction A1, and includes the inner circumferential surface 46 of the recessed portion 42, the first wall surface 47 provided in the recessed portion 42, and the second wall surface 48 provided on the protrusion 49 extending from the inner circumferential surface 11a of the casing 11 to the upstream side in the steam flow direction A1, and the inner lower surface 50 of the protrusion 49 in the radial direction R of the rotor 12 is located outside in the radial direction R of the rotor 12 from the inner lower surface 41b of the shroud 41 in the radial direction R of the rotor 12. Consequently, when the swirling steams S3 and S4 generated in the swirling flow generation chamber 31 are guided to the end portion of the shroud 41 and then merge into the main flow steam S1, the swirling steam S5 can be smoothly merged while the protrusion 49 does not get in the way and the swirling steam S5 does not interfere with the main flow steam S1.

In the rotating machine of the first embodiment, the second guiding member 33 has a tapered shape from the first wall surface 47 to the upstream side in the steam flow direction A1. Consequently, the leakage steam S2 from the sealing device 15 can be properly generated as the outer and inner swirling steams S3 and S4 by the second guiding member 33.

In the rotating machine of the first embodiment, the first curved surfaces 51 and 52 are provided at the connection portions between the second guiding member 33 and the first wall surface 47. Consequently, when the leakage steam S2 from the sealing device 15 is guided by the second guiding member 33 and the outer and inner swirling steams S3 and S4 are generated in the swirling flow generation chamber 31, the leakage steam S2 flows from the second guiding member 33 to the first wall surface 47 via the first curved surfaces 51 and 52, so that it is possible to suppress the generation of a separation vortex in the swirling flow generation chamber 31 and to reduce pressure less.

In the rotating machine of the first embodiment, the second curved surface 53 is provided at the connection portion between the inner circumferential surface 46 and the first wall surface 47, and the third curved surface 54 is provided at the connection portion between the first wall surface 47 and the second wall surface 48. Consequently, when the leakage steam S2 from the sealing device 15 is guided by the second guiding member 33 and the outer and inner swirling steams S3 and S4 are generated in the swirling flow generation chamber 31, the leakage steam S2 flows from the first wall surface 47 to the inner circumferential surface 46 via the second curved surface 53 and flows from the first wall surface 47 to the second wall surface 44 via the third curved surface 54, so that it is possible to suppress the generation of a separation vortex in the swirling flow generation chamber 31 and to reduce pressure loss.

Second Embodiment

Figure 6:
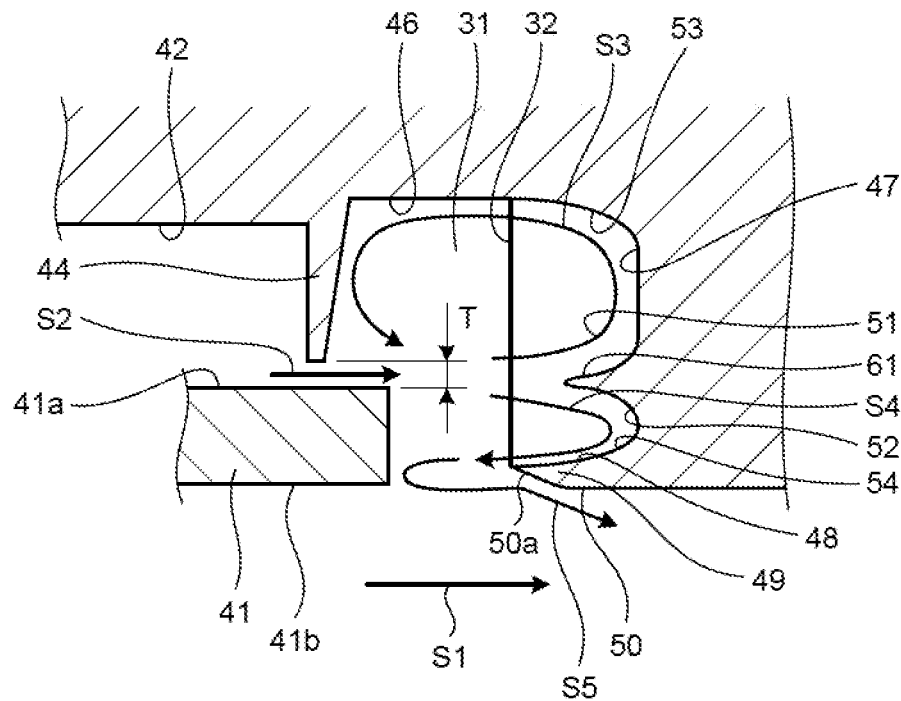
FIG. 6 is a sectional view of main elements for explaining the flow of steam in a steam turbine as a rotating machine of a second embodiment.

FIG. 6 is a sectional view of main elements for explaining the flow of steam in a steam turbine as a rotating machine according to a second embodiment. Noted that the basic configuration of the second embodiment is the same as that of the aforementioned first embodiment, members described with reference to FIG. 1 and having the same functions as those of the first embodiment are denoted by the same reference numerals, and a detailed description thereof will be omitted.

In the second embodiment, as illustrated in FIG. 1 and FIG. 6, the steam turbine 10 includes the casino 11, the rotor 12, the stator blades 13, the rotor blades 14, the sealing devices 15, the swirling flow generation chamber 31, the first guiding members 32, and a second guiding member 61. The swirling flow generation chamber 31 and the first guiding members 32 are the same as those of the first embodiment.

The second guiding member 61 is provided at a position facing the axial direction A of the rotor 12 with respect to the leakage position of the leakage steam S2 in the sealing device 15. That is, the second guiding member 61 is provided to face the downstream side in the steam flow direction A1 with respect to the gap T (see FIG. 4) between the tip of the seal fin 44 and the cater circumferential surface 41a of the shroud 41.

The second guiding member 33 extends from the first wall surface 47 of the swirling flow generation chamber 31 to the upstream side in the steam flow direction A1. The second guiding member 33 intersects (is orthogonal to) the first guiding members 32. A length of the second guiding member 61 in the axial direction A of the rotor 12 is shorter than those of the first guiding members 32 in the axial direction A of the rotor 12.

Therefore, the leakage steam S2 leaking from the sealing device 15 has the velocity component in the circumferential direction C because it passes through the stator blade 13 but does not pass through the rotor blade 14. The leakage steam S2 with the velocity component in the circumferential direction C becomes the swirling steams S3 and S4 having a center axis along the circumferential direction C in the swirling flow generation chamber 31. That is, the leakage steam 32 is guided by the first guiding members 32 when flowing into the swirling flow generation chamber 31 and becomes the swirling steams S3 and S4 with a reduced velocity component in the circumferential direction C. Here, the second guiding member 61 is provided in the swirling flow generation chamber 31, so that the leakage steam S2 is guided by the second guiding member 61 and becomes the swirling steam S3 that swirls outward in the radial direction R and the swirling steam S4 that swirls inward in the radial direction R. Since the upper and lower swirling steams S3 and S4 are guided by the second guiding member 61, variations in the shapes of the swirling steams S3 and S4 due to disturbance are suppressed and proper shapes of the swirling steams S3 and S4 are maintained.

Since the length of the second guiding member 61 is shorter than those of the first guiding members 32, an area where the leakage steam S2 having entered the swirling flow generation chamber 31 contacts with the second guiding member 61, is shortened to reduce a vortex generated by contact with the second guiding member 61, and the first guiding members 32 can effectively reduce the velocity component in the circumferential direction C of the leakage steam S2 without being disturbed by the second guiding member 61. Furthermore, it is possible to reduce the friction loss of the leakage steam S2 due to contact between the leakage steam S2 and the second guiding member 61.

Furthermore, the swirling steam S3 repeatedly swirls in the swirling flow generation chamber 31 and a part of the swirling steam S3 merges into the swirling steam S4. After the merging, the swirling steams S3 and S4 that have swirled in the swirling flow generation chamber 31 are guided to the rear end portion of the shroud 41, pass through between the shroud 41 and the protrusion 49, and then smoothly merge into the main flow steam S1 that has passed through the rotor blade 14, as the swirling steam S5 in which the velocity component in the circumferential direction C is reduced.

As described above, in the rotating machine of the second embodiment, the length of the second guiding member 61 in the axial direction A of the rotor 12 is shorter than those of the first guiding members 32 in the axial direction A of the rotor 12.

Consequently, it is possible to effectively reduce the velocity component in the circumferential direction C of the leakage steam S2 by the first guiding numbers 32, and to reduce the friction loss of the leakage steam S2 due to contact between the leakage steam S2 and the second guiding member 61.

Third Embodiment

Figure 7:
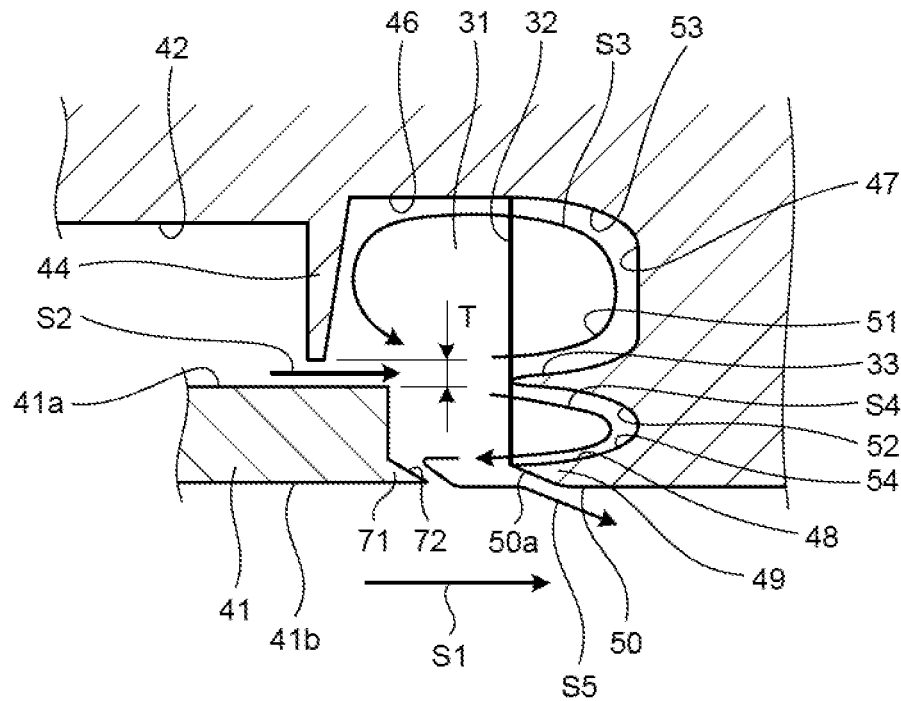
FIG. 7 is a sectional view of main elements for explaining the flow of steam in a steam turbine as a rotating machine of a third embodiment.

FIG. 7 is a sectional view of main elements for explaining the flow of steam in a steam turbine as a rotating machine according to a third embodiment. Noted that the basic configuration of the third embodiment is the same as that of the aforementioned first embodiment, members described with reference to FIG. 1 and having the same functions as those of the first embodiment are denoted by the same reference numerals, and a detailed description thereof will be omitted.

In the third embodiment, as illustrated in FIG. 1 and FIG. 7, the steam turbine 10 includes the casing 11, the rotor 12, the stator blades 13, the rotor blades 14, the sealing devices 15, the swirling flow generation chamber 31, the first guiding members 32, and the second guiding member 33. The swirling flow generation chamber 31, the first guiding members 32, and the second guiding member 33 are the same as those of the first embodiment.

The rotor blade 14 is provided with a shroud 41 at the tip thereof located inside in the radial direction R. The base end portions of the seal fins 43 and 44 are fixed to the inner circumferential surface 42a of the recessed portion 42, and the base end portion of the seal fin 45 is fixed to the cuter circumferential surface 41a of the shroud 41. A predetermined gap is secured between the tips of the seal fins 43 and 44 and the outer circumferential surface 41a of the shroud 41, and a predetermined gap is secured between the tip of the seal fin 45 and the inner circumferential surface 42a of the recessed portion 42. The casing 11 is provided with the protrusion 49 extending from the inner circumferential surface 11a of the casing 11 to the shroud 41 side. The lower surface 50 of the protrusion 49 is located outside in the radial direction R from the lower surface 41b of the shroud 41, and the inclination surface 50a is formed at the tip of the lower surface 50.

The shroud 41 is provided on the end portion thereof on the downstream side in the steam flow direction A1 with a third guiding member 71 facing the protrusion 49 in the axial direction A of the rotor 12. The third guiding member 71 is provided at an intersection between the lower surface 41b and a rear end surface 41c of the shroud 41 and extends to the downstream side in the steam flow direction A1. The third guiding member 71 is a flat lower surface continuous with the lower surface 41b of the shroud 41, and has an inclination surface 72 inclined with respect to the lower surface 41b and the rear end surface 41c of the shroud 41. The inclination surface faces the outside in the radial direction R of the rotor 12 and the downstream side in the steam flow direction A1.

Therefore, the leakage steam S2 leaking from the sealing device 15 has the velocity component in the circumferential direction C because it passes through the stator blade 13 but does not pass through the rotor blade 14. The leakage steam S2 with the velocity component in the circumferential direction C becomes the swirling steams S3 and 34 having a center axis along the circumferential direction C in the swirling flow generation chamber 31. That is, the leakage steam S2 is guided by the first guiding members 32 when flowing into the swirling flow generation chamber 31 and becomes the swirling steams S3 and S4 with a reduced velocity component in the circumferential direction C. Here, the second guiding member 33 is provided in the swirling flow generation chamber 31, so that the leakage steam 32 is guided by the second guiding member 33 and becomes the swirling steam S3 that swirls outward in the radial direction R and the swirling steam S4 that swirls inward in the radial direction R. Since the upper and lower swirling steams S3 and S4 are guided by the second guiding member 33, variations in the shapes of the swirling steams S3 and 34 due to disturbance are suppressed and proper shapes of the swirling steams S3 and S4 are maintained.

Furthermore, the swirling steam S3 repeatedly swirls in the swirling flow generation chamber 31 and a part of the swirling steam S3 merges into the swirling steam S4. After the merging, the swirling steams S3 and 34 that have swirled in the swirling flow generation chamber 31 flow to the rear end portion side of the shroud 41 and are guided by the third guiding member 71. That is, the swirling steam S5 that has flowed to the upstream side in the steam flow direction A1 after being discharged from the swirling flow generation chamber 31, is guided from the rear end surface 41c of the shroud 41 to the inclination surface 72 of the third guiding member 71, and flows to the downstream side in the steam flow direction A1. The swirling steam S5 flowing to the downstream side in the steam flow direction A1 is substantially parallel to the main flow steam S1, passes through between the shroud 41 and the protrusion 49, and smoothly merges into the main flow steam S1 having passed through the rotor blade 14.

As described above, in the rotating machine of the third embodiment, the shroud 41 is provided on the downstream side in the steam flow direction A1 with the third guiding member 71 facing the protrusion 49 in the axial direction A of the rotor 12.

Consequently, when the swirling steams S3 and S4 generated in the swirling flow generation chamber 31 are guided to the rear end portion of the shroud 41, the swirling steams S3 and S4 are substantially parallel to the main flow steam S1 by being guided by the third guiding member 71, so that it is possible to allow the swirling steam S5 to smoothly merge into the main flow steam S1 without interfering with the main flow steam S1.

Fourth Embodiment

Figure 8:
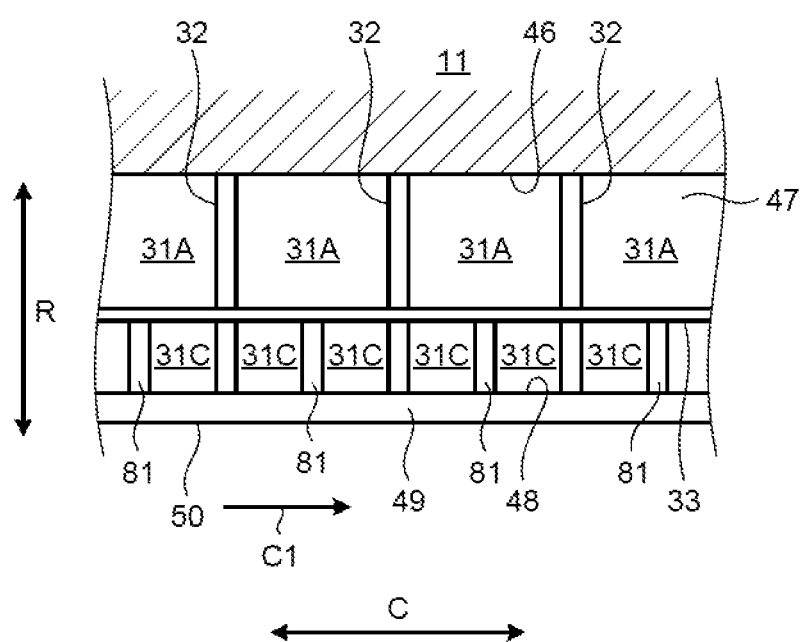
FIG. 8 is a sectional view of main elements for explaining the flow of steam in a steam turbine as a rotating machine of a fourth embodiment.

FIG. 8 is a sectional view of main elements for explaining the flow of steam in a steam turbine as a rotating machine according to a fourth embodiment. Noted that the basic configuration of the fourth embodiment is the same as that of the aforementioned first embodiment, members described with reference to FIG. 1 and having the same functions as those of the first embodiment are denoted by the same reference numerals, and a detailed description thereof will be omitted.

In the fourth embodiment, as illustrated in FIG. 1 and FIG. 8, the steam turbine 10 includes the casing 11, the rotor 12, the stator blades 13, the rotor blades 14, the sealing devices 15, the swirling flow generation chamber 31, the first guiding members 32, and the second guiding member 33. The swirling flow generation chamber 31, the first guiding members 32, and the second guiding member 33 are the same as those of the first embodiment.

The first guiding members 32 are provided in the swirling flow generation chamber 31 along the radial direction R of the rotor 12 and in the circumferential direction C of the rotor 12 at predetermined intervals. The first guiding members 32 each have a plate shape along the radial direction R and the axial direction A of the rotor 12 and are fixed to the inner circumferential surface 46, the first wall surface 47, and the second wall surface 48. The second guiding member 33 is provided to face the downstream side in the steam flow direction A1 with respect to the gap T between the tip of the seal fin 44 and the outer circumferential surface 41a of the shroud 41. The second guiding member 33 has a cylindrical shape along the circumferential direction C and the axial direction A of the rotor 12 and is fixed to the first wall surface 47.

The first guiding members 32 and the second guiding member 33 are provided to intersect each other in the swirling flow generation chamber 31. Furthermore, a plurality of first guiding members 81 are provided between the second guiding member 33 and the protrusion 49 and between the first guiding members 32. The first guiding members 81 each have a plate shape along the radial direction R and the axial direction A of the rotor 12 and are fixed to the second guiding member 33, the first wall surface 47, and the second wall surface 48. In the swirling flow generation chamber 31, the first guiding members 32 and the second guiding member 33 intersect each other and the first guiding members 81 are provided, so that the swirling flow generation chamber 31 is divided by the second guiding member 33 into the first swirling flow generation chambers 31A outside in the radial direction R along the circumferential direction C and a plurality of second swirling flow generation chambers 31C inside in the radial direction R along the circumferential direction C.

That is, the swirling flow generation chamber 31 is divided by the second guiding member 33 into the first swirling flow generation chambers 31A located outside in the radial direction R of tike rotor 12 and the second swirling flow generation chambers 31C located inside in the radial direction R of the rotor 12, the first guiding members 32 are provided on the side of the first swirling flow generation chambers 31A, and the first guiding members 32 and 81 are provided on the side of the second swirling flow generation chambers 31C. Therefore, the numbers of the first guiding members 32 and 81 on the side of the second swirling flow generation chambers 31C are larger than those of the first guiding members 32 and 81 on the side of the first swirling flow generation chambers 31A.

Therefore, the leakage steam S2 leaking from the sealing device 15 has the velocity component in the circumferential direction C because it passes through the stator blade 13 but does not pass through the rotor blade 14. The leakage steam S2 with the velocity component in the circumferential direction C becomes the swirling steams S3 and S4 having a center axis along the circumferential direction C in the swirling flow generation chamber 31. That is, the leakage steam S2 is guided by the first guiding members 32 when flowing into the swirling flow generation chamber 31 and becomes the swirling steams S3 and S4 with a reduced velocity component in the circumferential direction C. Here, the second guiding member 33 is provided in the swirling flow generation chamber 31, so that the leakage steam S2 is guided by the second guiding member 33 and becomes the swirling steam S3 that swirls outward in the radial direction R and the swirling steam S4 that swirls inward in the radial direction R. Since the upper and lower swirling steams S3 and S4 are guided by the second guiding member 33, variations in the shapes of the swirling steams S3 and S4 due to disturbance are suppressed and proper shapes of the swirling steams S3 and S4 are maintained.

At this time, the swirling steam S3 repeatedly swirls in the first swirling flow generation chambers 31A and a part of the swirling steam S3 merges into the swirling steam S4. On the other hand, the swirling steam S4 swirls in the second swirling flow generation chambers 31C only once, and a part of the swirling steam S3 merges. Since the number of the first guiding members 32 is small in the first swirling flow generation chambers 31A, when the swirling steam S3 repeatedly swirls, it is possible to reduce separation between the swirling steam S3 and the first guiding members 32. On the other hand, since the numbers of the first guiding members 32 and 81 are large in the second swirling flow generation chambers 31C, when the swirling steam S4 swirls only once, it is possible to effectively reduce the velocity component in the circumferential direction of the swirling steam S4 by the first guiding members 32 and 81.

Thereafter, after the merging, the swirling steams S3 and S4 that have swirled in the swirling flow generation chamber 31 are guided to a rear end portion of the shroud 41, pass through between the shroud 41 and the protrusion 49, and then smoothly merge into the main flow steam S1 that has passed through the rotor blade 14, as swirling steam S5 in which the velocity component in the circumferential direction C is reduced.

As described above, in the rotating machine of the fourth embodiment, the swirling flow generation chamber 31 is divided by the second guiding member 33 into the first swirling flow generation chambers 31A located outside in the radial direction R or the rotor 12 and the second swirling flow generation chambers 31C located inside in the radial direction R of the rotor 12, and the numbers of the first guiding members 32 and 81 in the second swirling flow generation chambers 31C are larger than those of the first guiding members 32 and 81 in the first swirling flow generation chambers 31A.

Consequently, since the number of the first guiding members 32 in the first swirling flow generation chambers 31A is small, when the swirling steam S3 repeatedly swirls in the first swirling flow generation chambers 31A, it is possible to reduce separation between the first guiding members 32 and the steam S. Since the numbers of the first guiding members 32 and 81 in the second swirling flow generation chambers 31C are large, when the swirling steam S4 swirls in the second swirling flow generation chambers 31C only once, it is possible to effectively reduce the velocity component in the circumferential direction by the first guiding members 32 and 81.

Note that in the aforementioned embodiments, the first guiding member is provided in the whole area in the swirling flow generation chamber in the radial direction of the rotor, but it is sufficient if it is at least a position facing the gap of the sealing device in the axial direction and the outer and inner sides of the position in the radial direction may be eliminated. That is, the guiding member may be fixed only to the first wall portion.

Note that in the aforementioned embodiments, the seal device is a labyrinth seal, but may be other non-contact-type seals.

Furthermore, in the aforementioned embodiments, the rotating machine according to the present invention is applied to the steam turbine 10; however, the present invention is not limited to the steam turbine and can be applied to a rotating machine, such as a compressor and an exhaust turbine, in which internal pressure is higher than external pressure during its operation.

REFERENCE SIGNS LIST 10 steam turbine (rotating machine)
11 casing
11a inner circumferential surface
12 rotor
13 stator blade
14 rotor blade
15 sealing device
20 bearing
21 rotor disc
22 steam inlet
23 steam passage
24 blade cascade part
25 exhaust hood
26 steam discharge port
31 swirling flow generation chamber
31A first swirling flow generation chamber
31B, 31C second swirling flow generation chamber
32, 81 first guiding member
33, 61 second guiding member
41 shroud
41a outer circumferential surface
41b lower surface
42 recessed portion
42a inner circumferential surface
43, 44, 45 seal fin
46 inner circumferential surface
47 first wall surface
48 second wall surface
49 protrusion
50 lower surface
50a inclination surface
51, 52 first curved surface
53 second curved surface
54 third curved surface 71 third guiding member
72 inclination surface
A axial direction
A1 steam flow direction
C circumferential direction
C1 rotational direction
R radial direction
S steam
S1 main flow steam
S2 leakage steam
S3 swirling steam
S4 swirling steam
S5 leakage steam

The invention claimed is:

1. A rotating machine comprising:
a casing having a hollow shape;
a rotating, body rotatably supported in the casing;
a stator blade fixed to an inner peripheral portion of the casing;
a rotor blade fixed to an outer peripheral portion of the rotating body to be offset to the stator blade in an axial direction of the rotating body;
a sealing device arranged between the inner peripheral portion of the casing and a tip of the rotor blade;
a swirling flow generation chamber provided in the casing on a downstream side in a fluid flow direction from the sealing device along a circumferential direction of the rotating body;
a plurality of first guiding members provided in the swirling flow generation chamber along a radial direction of the rotating body and in a circumferential direction of the rotating body at predetermined intervals; and
a second guiding member provided in the swirling flow generation chamber along the circumferential direction of the rotating body while intersecting the first guiding members.

2. The rotating machine according to claim 1, wherein the second guiding member is provided at a position facing the axial direction of the rotating body with respect to a leakage position of a fluid in the sealing device.

3. The rotating machine according to claim 2, wherein the sealing device has a seal fin that extends from one to another one of the inner peripheral portion of the casing and the tip of the rotor blade and forms a gap, and the second guiding member is provided to face the downstream side in the fluid flow direction with respect to the gap.

4. The rotating machine according to claim 3, wherein the sealing device has a seal fin that extends from the inner peripheral portion of the casing to the tip of the rotor blade and forms a gap, and a tip of the second guiding member is located outside in the radial direction of the rotating body from the tip of the rotor blade and is located inside in the radial direction of the rotating body from a tip of the seal fin.

5. The rotating machine according to claim 1, wherein the first guiding members and the second guiding member have a same length in the axial direction of the rotating body.

6. The rotating machine according to claim 1, wherein a length of the second guiding member in the axial direction of the rotating body is shorter than a length of the first guiding members in the axial direction of the rotating body.

7. The rotating machine according to claim 1, wherein the swirling flow generation chamber includes an inner circumferential surface of the casing, a first wall surface facing the downstream side in the fluid flow direction with respect to the sealing device in the casing, and a second wall surface facing inward in the radial direction of the rotating body with respect to the inner circumferential surface of the casing, and the second guiding member extends from the first wall surface to an upstream side in the fluid flow direction.

8. The rotating machine according to claim 7, wherein a recessed portion is formed in the inner circumferential surface of the casing, a shroud fixed to the tip of the rotor blade is arranged in the recessed portion with a predetermined gap, the swirling flow generation chamber is provided in the recessed portion on the downstream side in the fluid flow direction and includes an inner circumferential surface of the recessed portion, the first wall surface provided in the recessed portion, and the second wall surface provided on a protrusion extending from the inner circumferential surface of the casing to the upstream side in the fluid flow direction, and an inner surface of the protrusion in the radial direction of the rotating body is located outside in the radial direction of the rotating body from an inner surface of the shroud in the radial direction of the rotating body.

9. The rotating machine according to claim 8, wherein the shroud is provided on the downstream side in the fluid flow direction with a third guiding member facing the protrusion in the axial direction of the rotating body.

10. The rotating machine according to claim 7, wherein the second guiding member has a tapered shape from the first wall surface to the upstream side in the fluid flow direction.

11. The rotating machine according to claim 7, wherein a first curved surface is provided at a connection portion between the second guiding member and the first wall surface.

12. The rotating machine according to claim 7, wherein a second curved surface is provided at a connection portion between the inner circumferential surface of the casing and the first wall surface, and a third curved surface is provided at a connection portion between the first wall surface and the second wall surface.

13. The rotating machine according to claim 1, wherein the swirling flow generation chamber is divided by the second guiding member into first swirling flow generation chambers located outside in the radial direction of the rotating body and second swirling flow generation chambers located inside in the radial direction of the rotating body, and number of the first guiding members in the second swirling flow generation chambers is larger than number of the first guiding members in the first swirling flow generation chambers.

* * * * *